Feb. 14, 1933. W. I. BATTIN ET AL 1,897,950
GAS GENERATOR
Filed July 25, 1927 4 Sheets-Sheet 2

WITNESS:
Robt P Mitchel

INVENTORS
William I Battin
Charles S. Chrisman
BY
Augustus B. Stoughton
ATTORNEY.

Patented Feb. 14, 1933

1,897,950

UNITED STATES PATENT OFFICE

WILLIAM I. BATTIN, OF PHILADELPHIA, AND CHARLES S. CHRISMAN, OF WEST CHESTER, PENNSYLVANIA, ASSIGNORS TO THE U. G. I. CONTRACTING COMPANY, OF PHILADELPHIA, PENNSYLVANIA, A CORPORATION OF DELAWARE

GAS GENERATOR

Application filed July 25, 1927. Serial No. 208,137.

The object of the present invention is to improve gas generators of the type in which the adherence of clinker to the side wall is prevented by the use of a cooled wall, by affording a free downward movement of the fuel and at the same time maintaining the temperature of the fuel bed at its periphery high enough to permit of efficient gas production.

Although this invention is applicable to the production of producer gas, it is especially applicable to water gas manufacture, as in the latter, there are very frequent and rapid changes in the temperature and in the composition of the fluids passing through the fuel bed as the fuel bed is blasted alternately with air and steam which produce exothermic and endothermic reactions respectively and as the blast products and water gas alternate with each other in flowing through the fuel bed.

It is old in the art to employ a gas generator having a water jacket to prevent the adherence of clinker to the wall. In such generators now employed, the inner metal wall of the jacket is in contact with the fuel bed and this wall offers too little resistance to the transfer of heat from the fuel bed, so that the periphery of the fire is unduly chilled, with consequent loss of efficiency. While this heat may be recovered as steam, that is an expensive method of steam generation. Moreover the abrasive action of the fuel during its descent through the generator is such as to wear considerably the jacket wall and to necessitate replacement of the jacket plates. This replacement in present gas generators is difficult and costly.

It is also old to cool the walls of a generator by means of refractory blocks laid in the form of a solid wall to one face of which air is applied. This is open to the following objections. The refractory (especially in the lower zone of the generator where the ranges of temperature are greatest and the variations of other conditions and the chemical actions are most severe), is liable to oxidize or spall, either of which gives it a rough surface. Although it may be sufficiently cooled to prevent clinker fusing to it, the clinker will adhere to it mechanically. It is also difficult to keep the joints between the refractory blocks sufficiently tight to prevent the leakage of air into the fuel bed at various points up the wall.

According to the present invention a gas generator is provided in which there is imposed between the fuel bed and the jacket wall, an easily replaceable facing providing air spaces or joints adapted to oppose heat transfer and presenting a permanently smooth surface for the unimpeded descent of the ignited column of fuel. Such a facing may comprise loosely arranged or fitted metallic blocks (or plates) or refractory material which reduce the flow of heat from the fire to the metal wall of the cooling jacket and also protect the wall of the cooling jacket from wear. At the same time by contact with the jacket, the facing itself is kept sufficiently cool to prevent its destruction by the fire.

We have found by experiment that the flow of heat from the fire to the jacket, (operating the generator for water gas manufacture) is approximately twice as great when the jacket wall itself is exposed to the fire as when cast iron blocks are interposed between the water jacket and the fire. We have also found that the jacket at the same time so cooled the blocks that they suffered no appreciable deterioration after many months of operation.

We have also found that when the jacket is cooled by air or steam, metallic blocks interposed between it and the fire are sufficiently cooled to prevent their destruction, and that the clinker does not adhere to them. Furthermore, they effectively protected the thin steel jacket wall, although under similar operating conditions, when they were removed the jacket wall was quickly burned through.

Referring to the accompanying drawings—

Figure 1:
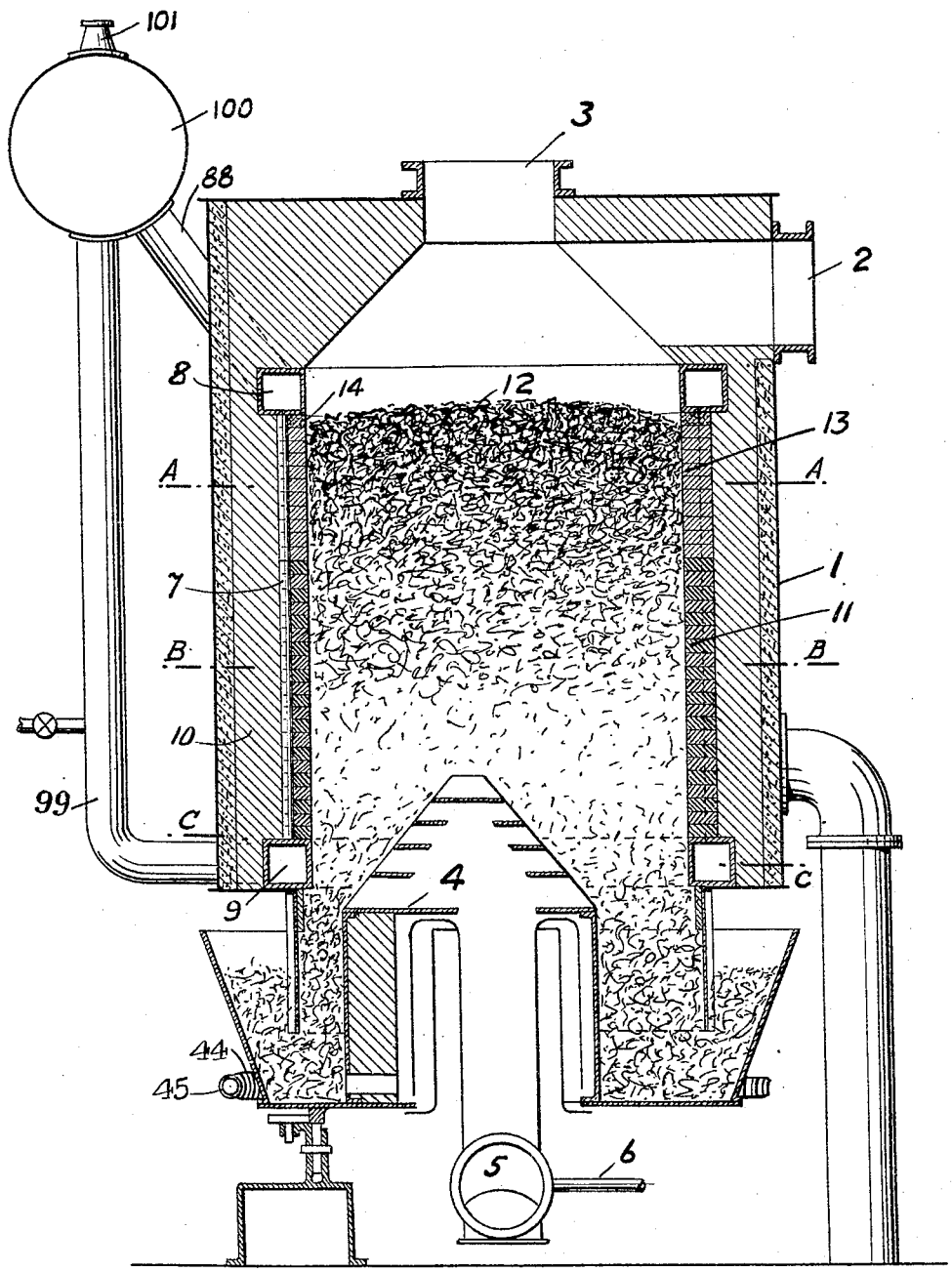
Fig. 1 is a vertical cross section of a gas generator in which water cooled tubes are used as the jacket, and both metallic blocks and refractory blocks loosely laid are used as the jacket wall facing.
Figure 2:
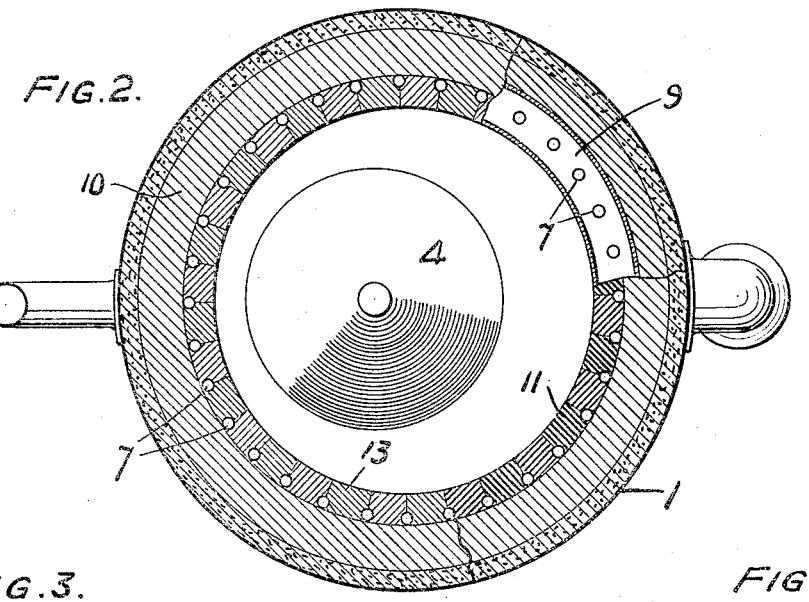
Fig. 2 is a horizontal cross section along the lines A—A, B—B and C—C in Fig. 1. The different sections being shown as broken away.

Referring more particularly to Figures 1 and 2, 1 is the gas generator shell, 2 the generated gas outlet, 3 the charging opening, 4 the mechanical rate, 5 the air blast supply and 6 the steam supply. Grate 4 may be rotatable by means of gear 44 and worm 45 or may be stationary.

7 are water tubes terminating in the upper and lower headers 8 and 9 respectively. Headers 8 and 9 are connected by pipes 88 and 99 to drum 100, the whole, together with the water tubes 7, forming a steam boiler having a pipe 101 attached thereto which forms a means for leading off steam from said boiler. The space between the tubes and the shell is filled with heat insulating material 10. The blocks 11 as shown are interposed between the jacket tubes 7 and the fuel bed 12.

In the lower part of the generator, which in operation is the zone of highest temperature and greatest clinker formation, these blocks 11 are preferably metallic affording a wall facing to which the clinker will not adhere. Above the zone of greatest clinker formation, it is desirable that the wall be cooled somewhat but not so greatly as lower down. Here the temperatures are not as high and other conditions are more uniform making possible the use of the refractory blocks 13 which do not transfer as much heat as the metallic blocks. It is preferable to use refractory blocks where possible because of their lower cost and because it is preferable to transfer as little heat from the fuel bed as practicable, so as not to reduce the fuel bed temperature lower than necessary.

Figure 3:
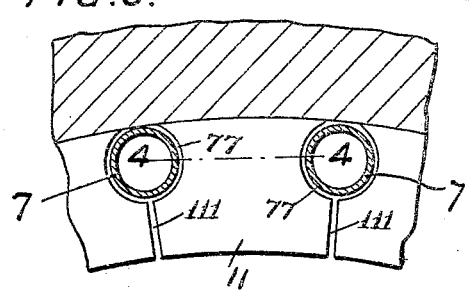
Fig. 3 is a horizontal cross section of a portion of the generator wall drawn to an enlarged scale.
Figure 4:
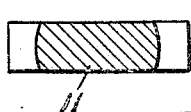
Fig. 4 is a vertical cross section of a facing block along line 4—4 in Fig. 3.

The refractory and metallic blocks may be of the same shape and are well illustrated in reference to the tubes in Figures 3 and 4.

Each block is preferably shaped to fit loosely between two adjacent tubes 7, with its fire face extending half way across their surfaces and loosely abutting the adjacent blocks. The blocks are preferably of comparatively shallow depth, with reference to the tube spacing so that any block may by lifting and tilting be easily removed and replaced, when the blocks above it have been removed or lifted sufficiently to allow the tilting of the block which is to be replaced. To permit the lifting of the blocks for this purpose an annular space 14 (Fig. 1) may be provided above the upper course of blocks, this space being filled with plastic or other easily removable material.

The height to which the metallic facing blocks 11 may be carried is easily adjustable and may be determined by experiment to fit any conditions of operation as the location and extent of the zone of clinker formation will vary with the type of fuel and with operating conditions. This construction is easily adjustable to fit various conditions of fuel and operation permitting the unobstructed descent of the ignited fuel bed and at the same time limiting the transfer of heat from the fuel bed to the minimum amount practicable. The blocks also provide an easily removable wearing surface.

It is preferable to have the blocks fit loosely between the tubes as this allows for their distortion with a minimum of strain on the tubes. However, they may be bolted on or shrunk on, though in these cases they are not so easily replaceable. In any case air spaces occur, or otherwise stated, the path for heat transfer is interrupted or broken providing air spaces. The air spaces or heat transfer paths between the blocks 11 and the tubes 7 are indicated in the drawings at 77 and the pockets at 111.

Figure 5:
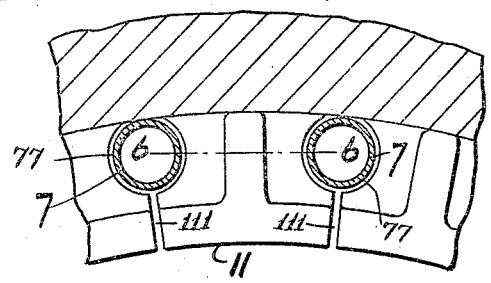
Fig. 5 is a horizontal cross section of a portion of the wall of the generator showing a modified form of facing.
Figure 6:
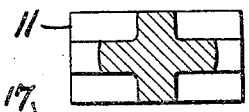
Fig. 6 is a section on line 6—6 of Fig. 5.

Referring to Figures 5 and 6, these figures show a cross section and elevations of a modified form of block, which is not solid as in the previous figures.

Figure 7:
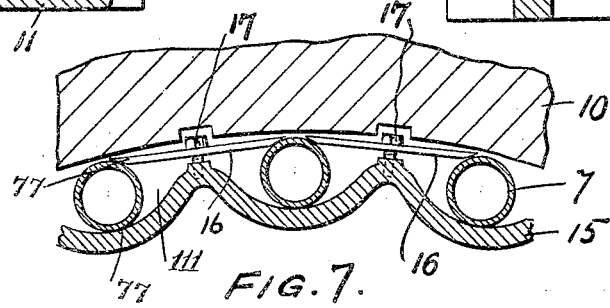
Fig. 7 is a horizontal cross section of a portion of the wall showing the use of bolted plates instead of blocks.

Although we consider it preferable to use the blocks described above, the invention is not limited to their use and other means disposed between the fuel bed and the cooling jacket may be used and fall within the scope of this invention. One such arrangement is shown in Figure 7. The plates 15, which may be corrugated as shown to allow for expansion are disposed between the fuel bed and the tubes in place of the blocks as before. These plates 15 may be locked to the tubes by such provisions as plates 16 and bolts 17 and they provide a wearing surface as do the blocks above, as well as reducing the transfer of heat from the fuel bed to the tubes. The heat is transferred from the blocks to the tubes by air spaces or heat transfer paths 77. The plates 15 may be carried to whatever height is desirable, the remainder of the wall being constructed as described of refractory material.

In connection with the foregoing figures of the drawings the generator has been described as having a cooling jacket formed of water tubes and has been shown in Figure 1 as having a mechanical rotary grate. However, any type of cooling jacket may be used and the invention is not limited to any particular cooling medium, and the generator may have the ordinary hand-cleaned grate.

Figure 8:
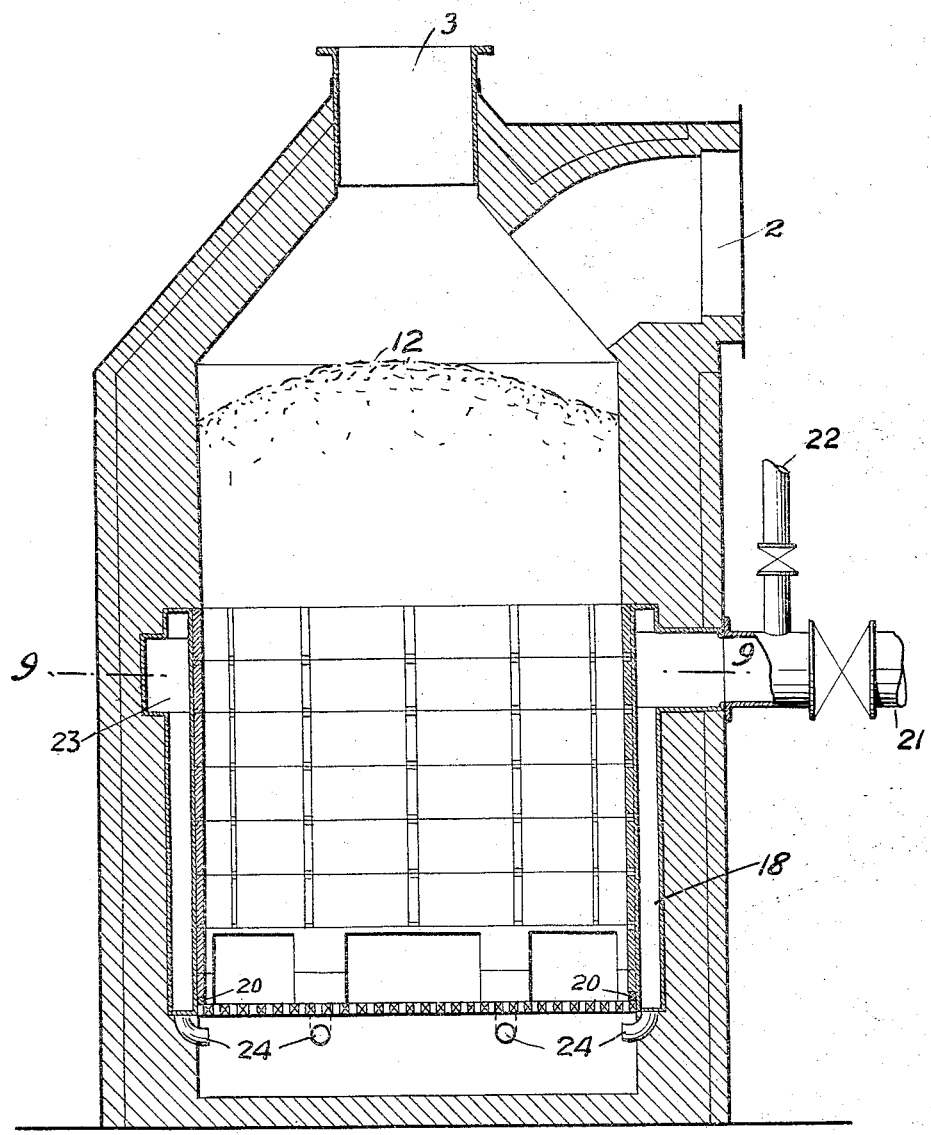
Fig. 8 is a vertical cross section of a generator illustrating a modification in which the cooling jacket is annular.
Figure 9:
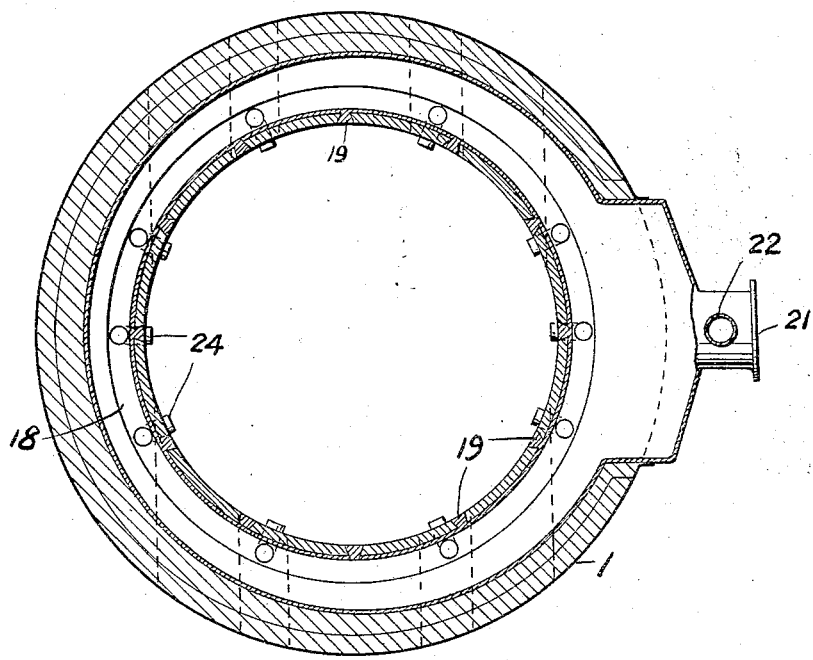
Fig. 9 is a horizontal cross section along the line 9—9 in Fig. 8.
Figure 10:
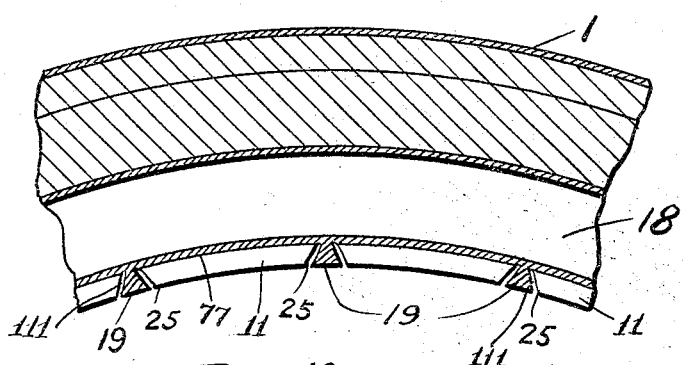
Fig. 10 is a horizontal section drawn to an enlarged scale of a portion of the wall of the generator shown in Fig. 9.

In Figures 8, 9 and 10 the generator is shown as having a continuous annular jacket 18 which is arranged for cooling by air or steam used in the gas making process. In this construction facing blocks may be used which are held in contact with the cooling jacket by lugs 19 secured to the cooling jacket. The blocks are arranged to slide down between the lugs, the bottom row resting on supporting lugs and the blocks resting on those below.

The annular type of jacket may be either continuous or interrupted and we have found by actual use that a jacket consisting of a series of vertical boxes side by side, protected by metallic facing blocks, has been satisfactory.

The jacket 18 is provided, connected to the air and steam supplies 21 and 22, through the duct 23 and is provided with the outlets 24 for the discharge of air and steam below the grate and thence up through the fuel bed 12. The inner wall of the jacket 18 is provided with the vertical lugs 19 which form the means for attaching the blocks 11. Lugs 19 are preferably discontinuous, consisting of short sections, so as to minimize their twisting and distorting. The lugs 19 are shown as trapezoidal in cross section but other shapes may be employed. The blocks may be metallic or refractory as in the constructions previously described, and they may have their edges 25 bevelled and they are preferably shaped to slide loosely down between the lugs 19, the supporting lugs 20 carrying the lower row of blocks, succeeding rows resting on those below. The blocks 11 have air spaces or heat transfer paths 77 at their rear between the blocks 11 and the jacket 18 and have pockets 111 between the lugs 19 and beveled portions 25. The blocks however may be bolted to the wall of the jacket if desired or secured by other means instead of by lugs.

As in previous illustrations, the metallic facing blocks may be used in the hottest zone and refractory ones above.

In Fig. 1 there are shown connections for supplying water to the tubes 7 by way of the header 9 and for leading off steam from the tubes by way of the header 8.

It will thus be seen that there are provided various means for attaching the blocks 11 or the plates 15 to the cooling elements. The attachment means may be the water tubes 7, the ribs or lugs 19 or the plates 16 and the bolts 17. In any case there may be a discontinuous path for the transfer of heat between the attaching means and the cooling means.

It will be obvious to those skilled in the art to which the invention relates that modifications may be made in details of construction and arrangement and in matters of mere form without departing from the spirit of the invention which is not limited to such matters or otherwise than the prior art and the appended claims may require.

We claim:

1. A generator for combustible gas adapted to contain a solid fuel bed and having means for passing steam and air into the fuel bed and having outlet connections for combustible gas therein, said generator having in combination a shell, a metallic cooling jacket within said shell, courses of metallic blocks having interfitting connections with the fireside wall of said shell and provided with air spaces between said blocks and partially surrounding said connections, and courses of blocks of refractory material surmounting said metallic blocks.

2. A generator for combustible gas adapted to contain a solid fuel bed and having means for passing steam and air into the fuel bed and having outlet means for combustible gas therein, a fuel chamber in said generator adapted to contain an ignited fuel bed forming a column, means for admitting fuel to said chamber to form said fuel bed, a layer of superimposed metallic blocks forming the lower part of the inner wall of said chamber in contact with said fuel bed to prevent the adhesion of clinker to said wall and being removable from the interior of said chamber, means for cooling said layer of metallic blocks, and refractory material forming the upper part of the inner wall of said chamber.

3. A generator for combustible gas adapted to contain a solid fuel bed and having means for introducing steam and air to the fuel bed and outlet means for combustible gas therein, a fuel chamber in said generator adapted to contain an ignited fuel bed forming a column, means for admitting fuel to said chamber to form said fuel bed, a layer of superimposed metallic blocks forming the lower part of the inner wall of said chamber in contact with said fuel bed to prevent the adhesion of clinker to said wall and being removable from the interior of said chamber, means for cooling said layer of metallic blocks, and a layer of blocks of refractory material superimposed on said first mentioned layer and forming the upper part of the inner wall of said chamber in contact with said fuel bed to retain heat in the upper portion of the fuel bed.

4. A generator for combustible gas adapted to contain a solid fuel bed and having means for introducing air and steam to the fuel bed and outlet means for combustible gas therein, a fuel chamber in said generator adapted to contain an ignited fuel bed forming a column, means for admitting fuel to said chamber to form said fuel bed, means for attaching a layer of lining material to walls of said chamber, a layer of superimposed metallic blocks forming the lower part of the inner wall of said chamber in contact with said fuel bed to prevent adhesion of clinker to said wall and having detachable connection from the interior of said chamber with said means for attaching, means for cooling said layer of metallic blocks, and refractory material forming the upper part of the inner wall of said chamber in contact with said fuel bed to retain heat in the upper portion of the fuel bed.

5. A generator according to claim 4, in which portions of the metallic blocks are spaced from the means for attaching to provide pockets therebetween in the inner wall of said generator.

6. A generator for combustible gas adapted to contain a solid fuel bed and having means for introducing air and steam to said fuel bed and outlet means for combustible gas therein, a fuel chamber in said generator adapted to contain an ignited fuel bed, means for admitting fuel to said chamber to form said fuel bed, a boiler having a plurality of tubes adjacent said fuel chamber, a layer of superimposed metallic blocks forming the lower part of the inner wall of said chamber in contact with said fuel bed to prevent adhesion of clinker to said wall and interfitting with the tubes of said boiler to be held thereby in position and detachable therefrom from the interior of said chamber, and a layer of superimposed refractory blocks imposed upon said first mentioned layer in contact with said fuel bed to retain heat in the upper part thereof and interfitting with the tubes of said boiler to be held thereby in position and detachable therefrom from the interior of said chamber.

7. A generator according to claim 6, in which portions of the metallic blocks and portions of the refractory blocks are spaced from the tubes of the boiler and from each other to provide pockets therebetween in the inner walls of said generator.

8. A generator for combustible gas adapted to contain a vertically descending, ignited bed of solid fuel and having means for passing air and steam into said fuel bed and outlet means for removing generated combustible gas, said generator having a fuel chamber for said ignited fuel bed, a refractory lining surrounding the upper, lateral portion of said chamber which contains a relatively cool portion of said fuel bed, a metallic lining surrounding the lower, lateral portion of said fuel bed which is relatively hot, said lining being adapted to resist the wear of the fuel bed and including an annular series of vertical, metallic, water tubes forming a part of a steam boiler, and means for leading off steam from said boiler.

9. A generator for combustible gas adapted to contain a vertically descending, ignited bed of solid fuel and having means for passing air and steam into said fuel bed and having outlet means for removing generated combustible gas, said generator having a fuel chamber for said ignited fuel bed, a refractory lining surrounding the upper, lateral portion of said chamber, a steam boiler, a portion of whose water circulating means consists of vertical, individual passages provided in a metallic lining arranged adjacent the lower lateral part of the fuel chamber, and means for leading off steam from said boiler.

WILLIAM I. BATTIN.
CHARLES S. CHRISMAN.